United States Patent
Hung et al.

(10) Patent No.: US 7,547,756 B2
(45) Date of Patent: Jun. 16, 2009

(54) BENZIMIDAZOLE-CONTAINING SULFONATED POLYETHERSULFONES

(75) Inventors: Joyce Hung, Niskayuna, NY (US);
Hongyi Zhou, Niskayuna, NY (US);
Daniel Joseph Brunelle, Burnt Hills, NY (US); Marianne Elisabeth Harmon, Niskayuna, NY (US); Daniel Steiger, Clifton Park, NY (US);
Hongwei Liu, Troy, NY (US); David Roger Moore, Albany, NY (US)

(73) Assignee: General Electric Company, Niskayuna, NY (US)

( * ) Notice: Subject to any disclaimer, the term of this patent is extended or adjusted under 35 U.S.C. 154(b) by 487 days.

(21) Appl. No.: 11/263,166

(22) Filed: Oct. 31, 2005

(65) Prior Publication Data
US 2007/0100131 A1    May 3, 2007

(51) Int. Cl.
*C08G 75/23*    (2006.01)
*C08G 75/20*    (2006.01)

(52) U.S. Cl. .................. 528/391; 528/373; 528/378; 528/480

(58) Field of Classification Search ............... 528/373, 528/378, 391, 480
See application file for complete search history.

(56) References Cited

U.S. PATENT DOCUMENTS 3,294,542 A    12/1966    Süs et al.

2002/0091225 A1    7/2002    McGrath et al.
2004/0249117 A1    12/2004    Acar et al.

*Primary Examiner*—Duc Truong
(74) *Attorney, Agent, or Firm*—Mary Louise Gioeni

(57) ABSTRACT

Sulfonated polyethersulfones and polymer compositions comprising sulfonated polyethersulfones and at least one inorganic heteropolyacid are useful as proton exchange membranes for fuel cells. The polyethersulfones include structural units derived from at least one biphenol monomer and a monomer of formula I

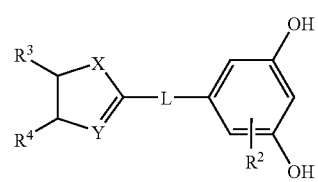

wherein X is O, S or $NR^1$;
Y is N or $CR^5$;
$R^1$, $R^2$, $R^3$ and $R^4$ are independently hydrogen, alkyl, substituted alkyl, aryl, substituted aryl, alkylaryl, substituted alkylaryl, arylalkyl or substituted arylalkyl, or
$R^3$ and $R^4$, taken together, form a 5- or 6-membered substituted or unsubstituted aliphatic or aromatic ring;
$R^5$ is hydrogen, alkyl, substituted alkyl, aryl, substituted aryl, alkylaryl, substituted alkylaryl, arylalkyl or substituted arylalkyl; and
L is a direct bond or a divalent aromatic linker containing 6-12 carbons.

26 Claims, 1 Drawing Sheet

BENZIMIDAZOLE-CONTAINING SULFONATED POLYETHERSULFONES

BACKGROUND

Figure 1:
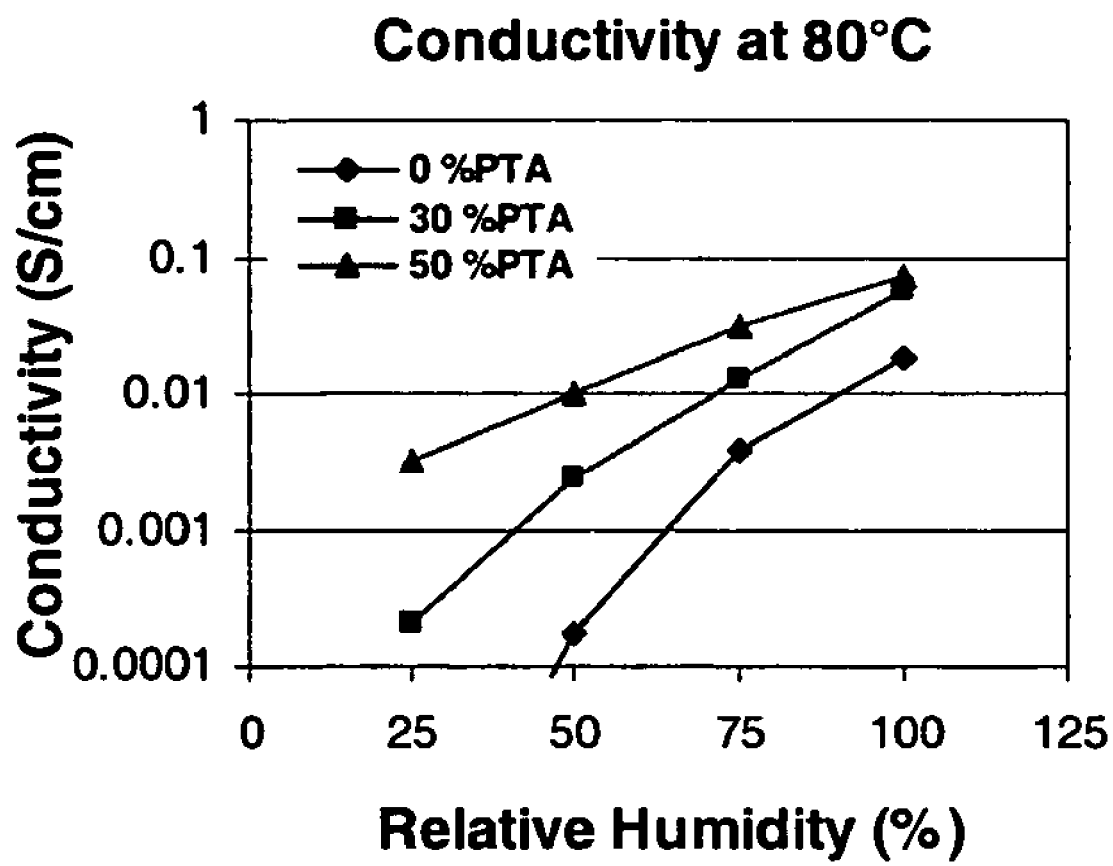

Interest in using fuel cells as a clean, alternative power source has driven years of intense research in polymer electrolyte membrane (PEM) fuel cell development to meet the cost and performance targets for automotive and portable applications. Current PEM fuel cells use mainly Nafion® or other perfluorosulfonic acid polymer membranes which have high proton conductivity and good chemical and mechanical stability under fully humidified conditions. However, the widespread use of these membranes has been limited by their cost and poor performance at low relative humidities (RH). Therefore, alternative low-cost membrane materials that have better performance in less humidified conditions are desired.

Polyethersulfones are well-known engineering thermoplastics that have excellent chemical and mechanical properties. Sulfonated versions obtained by post-polymerization sulfonation have been investigated extensively for fuel cell membrane applications. However, poor reproducibility and side reactions in the sulfonation process have led many to explore the direct copolymerization of sulfonated monomers to produce better controlled compositions of sulfonated polyethersulfones. Dispersing hydrophilic fillers into sulfonated polymers has been shown in some cases to enhance proton conductivity at low relative humidities, improve mechanical properties, and decrease methanol permeability (Alberti, G., Casciola, M. *Annu. Rev. Mater. Res.* (2003) 33, 129-154). McGrath et al. have described addition of heteropolyacids, such as phosphotungstic acid ($H_3PW_{12}O_{40}$), to sulfonated polyethersulfones; however, water solubility of the heteropolyacid leads to leaching of the filler (Kim, Y. S., Wang, F., Hickner, M., Zawodzinski, T. A., McGrath, J. E. *J. Membr. Sci.* (2003) 212, 263-282; U.S. 2002/0091225).

It would be desirable to prevent leaching of the filler and thereby enhance proton conductivity at low relative humidities, improve mechanical properties, and decrease methanol permeability.

BRIEF DESCRIPTION

It has been unexpectedly discovered that sulfonated pendant benzimidazole polyethersulfone compositions with phosphotungstic acid exhibit improved proton conductivity and low water uptake at high temperatures and low relative humidities. Incorporation of pendant benzimidazole functionalities in a sulfonated polyethersulfone backbone, and in situ formation of a heteropolyacid salt by reaction with the benzimidazole substituted polymer, produces a supported water-insoluble hydrophilic filler. Membranes that include such polymer compositions exhibit enhanced proton conductivity at low relative humidities, and improved mechanical properties.

Accordingly, in one embodiment, the present invention relates to sulfonated polyethersulfones and polymer compositions comprising the sulfonated polyethersulfones and at least one inorganic heteropolyacid for use as proton exchange membranes in fuel cells. The polyethersulfones include structural units derived from at least one biphenol monomer and a monomer of formula I

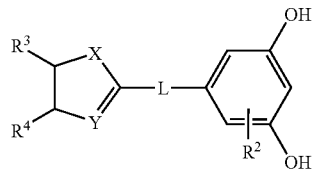

wherein X is O, S or $NR^1$;

Y is N or $CR^5$.

$R^1$, $R^2$, $R^3$ and $R^4$ are independently hydrogen, alkyl, substituted alkyl, aryl, substituted aryl, alkylaryl, substituted alkylaryl, arylalkyl or substituted arylalkyl, or $R^3$ and $R^4$, taken together, form a 5- or 6-membered substituted or unsubstituted aliphatic or aromatic ring;

$R^5$ is hydrogen, alkyl, substituted alkyl, aryl, substituted aryl, alkylaryl, substituted alkylaryl, arylalkyl or substituted arylalkyl; and L is a direct bond or a divalent aromatic linker containing 6-12 carbons.

The sulfonated polyethersulfones may include structural units derived from a dihalodiarylsulfone, and/or structural units derived from at least one sulfonated dihalodiarylsulfone. The inorganic heteropolyacid may be phosphotungstic acid. In one embodiment, the sulfonated polyethersulfones include structural units derived from a 4,4'-dihalodiphenylsulfone, a sulfonated 4,4'-dihalodiphenylsulfone, biphenol and 2-(3',5'-dihydroxyphenyl)benzimidazole.

In another embodiment, the present invention relates to proton exchange membranes comprising the sulfonated polyethersulfone/heteropolyacid compositions, and to fuel cells comprising the proton exchange membranes.

DRAWINGS

These and other features, aspects, and advantages of the present invention will become better understood when the following detailed description is read with reference to the accompanying drawings in which like characters represent like parts throughout the drawings, wherein:

FIG. 1 illustrates proton conductivity of 40% sulfonated 5% pendant benzimidazole polymers as a function of PTA content.

DETAILED DESCRIPTION

The present invention relates to sulfonated polyethersulfones and polymer compositions that include sulfonated polyethersulfones and at least one inorganic heteropolyacid. The sulfonated polyethersulfones include structural units derived from a monomer of formula I

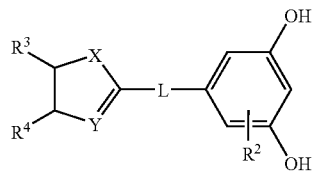

wherein X is O, S or NR$^1$,
Y is N or CR$^5$.
R$^1$, R$^2$, R$^3$ and R$^4$ are independently hydrogen, alkyl, substituted alkyl, aryl, substituted aryl, alkylaryl, substituted alkylaryl, arylalkyl or substituted arylalkyl, or
R$^3$ and R$^4$, taken together, form a 5- or 6-membered substituted or unsubstituted aliphatic or aromatic ring;
R$^5$ is hydrogen, alkyl, substituted alkyl, aryl, substituted aryl, alkylaryl, substituted alkylaryl, arylalkyl or substituted arylalkyl; and
L is a direct bond or a divalent aromatic linker containing 6-12 carbons.

In various embodiments, X may be NR$^1$, Y may be N and R$^1$ may be H; R$^2$ may be hydrogen; R$^3$ and R$^4$ may be taken together to form a 6-membered aromatic ring; R$^2$, R$^3$, R$^4$ may be hydrogen; or L may be a direct bond. In particular, the monomer of formula I may be a dihydroxybenzimidazole compound, and, more particularly, 2-(3',5'-dihydroxyphenyl) benzimidazole. Examples of groups that may be suitable divalent aromatic linkers are phenyl and biphenyl.

The sulfonated polyethersulfones typically contain from about 1 to about 25 mol % of the monomer of formula I, particularly from about 2 to about 15 mol %, and more particularly from about 2 to about 7 mol %. In one embodiment, the polymer contains about 5 mol % of the monomer.

Polyethersulfones contain aryl moieties linked by ether and sulfone groups. For sulfonated polyethersulfones, at least some of the aryl moieties, preferably those adjacent to the sulfone linkages, are substituted with sulfonate groups. The polymers are typically prepared by polycondensation of dihydroxyaryl monomers with dihalodiarylsulfones; alternately, condensation of dihalodiarylsulfone monomers, such as dichlorodiphenylsulfone, with dihydroxydiarylsulfones, such as dihydroxydiphenylsulfone may be used. Aryl groups of any of the sulfone monomers may be substituted with halogen groups, such as bromo, chloro, fluoro; alkyl groups, particularly C$_1$-C$_8$ alkyl; allyl groups, alkenyl groups, ether groups, alkyl ether groups, and cyano groups. It should be noted that substitution with chloro and/or fluoro groups may lead to branching and crosslinking of the sulfonated polyethersulfone. Accordingly, the sulfonated polyethersulfones include structural units derived from dihalodiarylsulfone monomers, particularly dihalodiphenylsulfones. Examples of suitable dihalodiphenyl sulfones include bis(4-chlorophenyl)sulfone and bis(4-fluorophenyl)sulfone. Sulfonated dihalodiarylsulfone monomers, particularly dihalodiphenylsulfone monomers, are typically used to prepare the sulfonated polymers, although the sulfonated polyethersulfones may be prepared by post-sulfonation if desired. Post-sulfonation means direct sulfonation of a non-sulfonated polyethersulfone composition, using a sulfonating reagent such as SO$_3$, ClSO$_3$H, Me$_3$SiSO$_3$Cl, or concentrated H$_2$SO$_4$. The use of sulfonated monomers is at times preferred since it typically allows greater control of polymer architecture, and compositions having unique microstructures are provided by the present invention. Examples of suitable sulfonated dihalodiphenylsulfone monomers include 4,4'-difluoro-3,3'-disulfonated-diphenylsulfone sodium and sodium and potassium salts; and 4,4'-dichloro-3,3'disulfonated-diphenylsulfone sodium and potassium salts; and 4,4'-diflurordiphenylsulfone-3,3bis(sulfonic acid) and 4,4'-dichlorodiphenylsulfone-3,3-bis(sulfonic acid).

The sulfonated polyethersulfones typically contain from about 30 to about 70 mol % sulfonation, particularly from about 40 to about 60 mol % sulfonation, and more particularly about 40 mol % sulfonation. For sulfonation levels less than about 30%, proton conductivity of the membranes is low, and for sulfonation levels greater than about 70%, swelling and water uptake is high.

The sulfonated polyethersulfones additionally include structural units derived from one or more dihydroxyaryl monomers, particularly bisphenol monomers Examples of suitable dihydroxyaryl monomers include bisphenol A, 4,4'-(hexafluoroisopropylidene)diphenol (6F-bisphenol), 4,4'-biphenol, hydroquinone and phenylphosphine oxide bisphenol. Aryl groups of any of the monomers may be substituted with halogen groups, such as bromo, chloro, fluoro; alkyl groups, particularly C$_1$-C$_8$ alkyl; allyl groups, alkenyl groups, ether groups, alkyl ether groups, and cyano groups. The bisphenol monomers may be either symmetrical or unsymmetrical.

Other dihydroxyaryl monomers that may be used to prepare the sulfonated polyethersulfones include 1,1-bis(4-hydroxyphenyl) cyclopentane;
2,2-bis(3-allyl-4-hydroxyphenyl) propane;
2,2-bis(2-t-butyl-4-hydroxy-5-methylphenyl) propane;
2,2-bis(3-t-butyl-4-hydroxy-6-methylphenyl) propane;
2,2-bis(3-t-butyl-4-hydroxy-6-methylphenyl) butane;
2,2-bis(3-methyl-4-hydroxyphenyl) propane; 2,2-bis(4-hydroxyphenyl)-1,1,1,3,3,3-hexafluoropropane; 1,1-bis(4-hydroxyphenyl)-2,2,2-trichloroethane;
1,1-bis(4-hydroxyphenyl) norbornane; 1,2-bis(4-hydroxyphenyl) ethane;
1,3-bis(4-hydroxyphenyl) propenone; bis(4-hydroxyphenyl) sulfide;
4,4-bis(4-hydroxyphenyl) pentanoic acid; 4,4-bis(3,5-dimethyl-4-hydroxyphenyl) pentanoic acid; 2,2-bis(4-hydroxyphenyl) acetic acid;
2,4'-dihydroxydiphenylmethane; bis(2-hydroxyphenyl) methane;
bis(4-hydroxyphenyl) methane; bis(4-hydroxy-5-nitrophenyl) methane;
bis(4-hydroxy-2,6-dimethyl-3-methoxyphenyl) methane; 1,1-bis(4-hydroxyphenyl) ethane; 1,1-bis(4-hydroxy-2-chlorophenyl) ethane; 2,2-bis(4-hydroxyphenyl) propane (bisphenol-A); 1,1-bis(4-hydroxyphenyl) propane;
2,2-bis(3-chloro-4-hydroxyphenyl) propane; 2,2-bis(3-bromo-4-hydroxyphenyl) propane; 2,2-bis(4-hydroxy-3-methylphenyl) propane;
2,2-bis(4-hydroxy-3-isopropylphenyl) propane; 2,2-bis(3-t-butyl-4-hydroxyphenyl) propane; 2,2-bis(3-phenyl-4-hydroxyphenyl) propane;
2,2-bis(3,5-dichloro-4-hydroxyphenyl) propane;
2,2-bis(3,5-dibromo-4-hydroxyphenyl) propane;
2,2-bis(3,5-dimethyl-4-hydroxyphenyl) propane;
2,2-bis(3-chloro-4-hydroxy-5-methylphenyl) propane;
2,2-bis(3-bromo-4-hydroxy-5-methylphenyl) propane;
2,2-bis(3-chloro-4-hydroxy-5-isopropylphenyl) propane;
2,2-bis(3-bromo-4-hydroxy-5-isopropylphenyl) propane;
2,2-bis(3-t-butyl-5-chloro-4-hydroxyphenyl) propane;
2,2-bis(3-bromo-5-t-butyl-4-hydroxyphenyl) propane;
2,2-bis(3-chloro-5-phenyl-4-hydroxyphenyl) propane;
2,2-bis(3-bromo-5-phenyl-4-hydroxyphenyl) propane;
2,2-bis(3,5-disopropyl-4-hydroxyphenyl) propane;
2,2-bis(3,5-di-t-butyl-4-hydroxyphenyl) propane;
2,2-bis(3,5-diphenyl-4-hydroxyphenyl) propane;
2,2-bis(4-hydroxy-2,3,5,6-tetrachlorophenyl) propane;
2,2-bis(4-hydroxy-2,3,5,6-tetrabromophenyl) propane;
2,2-bis(4-hydroxy-2,3,5,6-tetramethylphenyl) propane;
2,2-bis(2,6-dichloro-3,5-dimethyl-4-hydroxyphenyl) propane;
2,2-bis(2,6-dibromo-3,5-dimethyl-4-hydroxyphenyl) propane;

2,2-bis(4-hydroxy-3-ethylphenyl) propane; 2,2-bis(4-hydroxy-3,5-dimethylphenyl) propane; 2,2-bis(3,5,3',5'-tetrachloro4,4'-dihydroxyphenyl) propane;
1,1-bis(4-hydroxyphenyl) cyclohexylmethane; 2,2-bis(4-hydroxyphenyl)-1-phenylpropane; 1,1-bis(4-hydroxyphenyl) cyclohexane;
1,1-bis(3-chloro-4-hydroxyphenyl) cyclohexane; 1,1-bis(3-bromo-4-hydroxyphenyl) cyclohexane; 1,1-bis(4-hydroxy-3-methylphenyl) cyclohexane;
1,1-bis(4-hydroxy-3-isopropylphenyl) cyclohexane;
1,1-bis(3-t-butyl-4-hydroxyphenyl) cyclohexane; 1,1-bis(3-phenyl-4-hydroxyphenyl) cyclohexane; 1,1-bis(3,5-dichloro-4-hydroxyphenyl) cyclohexane;
1,1-bis(3,5-dibromo-4-hydroxyphenyl) cyclohexane;
1,1-bis(3,5-dimethyl-4-hydroxyphenyl) cyclohexane;
1,1-bis(3-chloro-4-hydroxy-5-methylphenyl) cyclohexane;
1,1-bis(3-bromo-4-hydroxy-5-methylphenyl) cyclohexane;
1,1-bis(3-chloro-4-hydroxy-5-isopropylphenyl) cyclohexane;
1,1-bis(3-bromo-4-hydroxy-5-isopropylphenyl) cyclohexane;
1,1-bis(3-t-butyl-5-chloro-4-hydroxyphenyl) cyclohexane;
1,1-bis(3-bromo-5-t-butyl-4-hydroxyphenyl) cyclohexane;
1,1-bis(3-chloro-5-phenyl-4-hydroxyphenyl) cyclohexane;
1,1-bis(3-bromo-5-phenyl-4-hydroxyphenyl) cyclohexane;
1,1-bis(3,5-disopropyl-4-hydroxyphenyl) cyclohexane;
1,1-bis(3,5-di-t-butyl-4-hydroxyphenyl) cyclohexane;
1,1-bis(3,5-diphenyl-4-hydroxyphenyl) cyclohexane;
1,1-bis(4-hydroxy-2,3,5,6-tetrachlorophenyl) cyclohexane;
1,1-bis(4-hydroxy-2,3,5,6-tetrabromophenyl) cyclohexane;
1,1-bis(4-hydroxy-2,3,5,6-tetramethylphenyl) cyclohexane;
1,1-bis(2,6-dichloro-3,5-dimethyl-4-hydroxyphenyl) cyclohexane;
1,1-bis(2,6-dibromo-3,5-dimethyl-4-hydroxyphenyl) cyclohexane;
1,1-bis(4-hydroxyphenyl)-3,3,5-trimethylcyclohexane;
1,1-bis(3-chloro-4-hydroxyphenyl)-3,3,5-trimethylcyclohexane;
1,1-bis(3-bromo-4-hydroxyphenyl)-3,3,5-trimethylcyclohexane;
1,1-bis(4-hydroxy-3-methylphenyl)-3,3,5-trimethylcyclohexane;
1,1-bis(4-hydroxy-3-isopropylphenyl)-3,3,5-trimethylcyclohexane;
1,1-bis(3-t-butyl-4-hydroxyphenyl)-3,3,5-trimethylcyclohexane;
1,1-bis(3-phenyl-4-hydroxyphenyl)-3,3,5-trimethylcyclohexane;
1,1-bis(3,5-dichloro-4-hydroxyphenyl)-3,3,5-trimethylcyclohexane;
1,1-bis(3,5-dibromo-4-hydroxyphenyl)-3,3,5-trimethylcyclohexane;
1,1-bis(3,5-dimethyl-4-hydroxyphenyl)-3,3,5-trimethylcyclohexane;
1,1-bis(3-chloro-4-hydroxy-5-methylphenyl)-3,3,5-trimethylcyclohexane;
1,1-bis(3-bromo-4-hydroxy-5-methylphenyl)-3,3,5-trimethylcyclohexane;
1,1-bis(3-chloro-4-hydroxy-5-isopropylphenyl)-3,3,5-trimethylcyclohexane;
1,1-bis(3-bromo-4-hydroxy-5-isopropylphenyl)-3,3,5-trimethylcyclohexane;
1,1-bis(3-t-butyl-5-chloro-4-hydroxyphenyl)-3,3,5-trimethylcyclohexane;
1,1-bis(3-bromo-5-t-butyl-4-hydroxyphenyl)-3,3,5-trimethylcyclohexane;
1,1-bis(3-chloro-5-phenyl-4-hydroxyphenyl)-3,3,5-trimethylcyclohexane;
1,1-bis(3-bromo-5-phenyl-4-hydroxyphenyl)-3,3,5-trimethylcyclohexane;
1,1-bis(3,5-disopropyl-4-hydroxyphenyl)-3,3,5-trimethylcyclohexane;
1,1-bis(3,5-di-t-butyl-4-hydroxyphenyl)-3,3,5-trimethylcyclohexane;
1,1-bis(3,5-diphenyl-4-hydroxyphenyl)-3,3,5-trimethylcyclohexane;
1,1-bis(4-hydroxy-2,3,5,6-tetrachlorophenyl)-3,3,5-trimethylcyclohexane;
1,1-bis(4-hydroxy-2,3,5,6-tetrabromophenyl)-3,3,5-trimethylcyclohexane;
1,1-bis(4-hydroxy-2,3,5,6-tetramethylphenyl)-3,3,5-trimethylcyclohexane;
1,1-bis(2,6-dichloro-3,5-dimethyl-4-hydroxyphenyl)-3,3,5-trimethylcyclohexane;
1,1-bis(2,6-dibromo-3,5-dimethyl-4-hydroxyphenyl)-3,3,5-trimethylcyclohexane;
4,4-bis(4-hydroxyphenyl) heptane; 1,1-bis(4-hydroxyphenyl) decane;
1,1-bis(4-hydroxyphenyl) cyclododecane; 1,1-bis(3,5-dimethyl-4-hydroxyphenyl) cyclododecane; and bis(4-hydroxyphenyl) methane.

The polyethersulfones and sulfonated polyethersulfones may be prepared by base-mediated direct nucleophilic aromatic substitution. Suitable solvents for the polymerization reaction include aromatic solvents such as toluene, xylene, anisole, chlorobenzene, and ortho-dichlorobenzene, as well as polar aprotic solvents such as N-methylpyrrolidinone, N,N-dimethylacetamide, dimethylsulfoxide, dimethylformamide, diphenylsulfone, and sulfolane. Suitable bases include inorganic bases such as sodium carbonate, sodium hydroxide, potassium carbonate, potassium hydroxide, lithium carbonate, lithium hydroxide, cesium carbonate and mixtures thereof. Synthetically useful reaction rates are typically achieved at reaction temperatures ranging between about 80° C. and about 200° C.

Inorganic heteropolyacids for use in the sulfonated polyethersulfone compositions of the present invention are cage-like structures with a primary, generally centrally located atom(s) surrounded by a cage framework, which framework contains a plurality of metal atoms, the same or different, bonded to oxygen atoms. The central element of heteropolyacids is different from metal atoms of the framework and is sometimes referred to as the "hetero" element or atom; the condensed coordination elements are referred to as the "framework" elements or metals, and are ordinarily transition metals. The principal framework metal, M, is any that has an appropriate cation radius and is a good oxygen π-electron acceptor. In particular, the framework metal may be tungsten or molybdenum. More particularly, the framework metal may be tungsten.

Conventional heteropolyacids (and polyoxoanions thereof) may be described by the general formula $H_e(X_kM_nO_y)^{-e}$, where k is 0 to 5, n is 5 to 20, y is 18 to 62, e is the negative charge on the $(X_kM_nO_y)$ polyoxoanion. In the formula, X, the central atom, is typically a Group 13-16 element. Suitable Group 13-16 elements include, but are not limited to: phosphorus, antimony, silicon and boron. In particular, the central atom, X, may be phosphorus, and M may be tungsten or molybdenum.

Specific examples of heteropolyacids useful in the present invention include, but are not limited to: phosphotungstic acid $(H_3PW_{12}O_{40})$, phosphomolybdic acid $(H_3PMo_{12}O_{40})$, $H_4SiW_{12}O_{40}$, $(VO)_{1.5}PMo_{12}O_{40}$, $(VO)_{1.5}PW_{12}O_{40}$, $(TiO)_{1.5}$ $PMo_{12}O_{40}$, $H(VO)PMo_{12}O_{40}$, $H(VO)PW_{12}O_{40}$, $H_6PV_3Mo_9O_{40}$, $H_5PV_2Mo_{10}O_{40}$, $H_5PV_2W_{10}O_{40}$, $H_4PVMo_{11}O_{40}$, $H_4PVW_{11}O_{40}$, $RhPMo_{12}O_{40}$, $BiPMo_{12}O_{40}$, $HCrPVMo_{11}O_{40}$, $HBiPVMo_{11}O_{40}$. In particular, the heteropolyacid may be phosphotungstic acid, $H_3PW_{12}O_{40}$.

The heteropolyacids are commercially available or may be prepared by a variety of methods known in the art. General syntheses of the heteropolyacids are described in Pope et. al., *Heteropoly and Isopoly Oxometallates*, Springer-Verlag, New York (1983). Typically, heteropolyacids are prepared by dissolving the desired metal oxides in water, adjusting the pH to approximately 1 to 2 with acid, such as hydrochloric acid, to provide the necessary protons, and then evaporating water until the desired heteropolyacid precipitates. As an example, the heteropolyacid $H_3PMo_{12}O_{40}$ can be prepared by combining $Na_2HPO_4$ and $Na_2MoO_4$, adjusting the pH with sulfuric acid, extracting with ether, and crystallizing the resulting heteropolyacid in water.

Hydrophilic inorganic fillers, such as metal oxides and layered phosphates/phosphonates may also be included in the sulfonated polyethersulfone compositions. Suitable metal oxide fillers include titania and silica, and suitable layered phosphates/phosphonates include zirconium phosphates/phosphonates and phosphatoantimonic acid.

The sulfonated polyethersulfone compositions may additionally include additives including organic and inorganic pigments, dyes, impact modifiers, UV screeners, hindered amine light stabilizers, degassing agents, viscosity modifying agents, corrosion inhibitors, surface tension modifiers, surfactants, flame retardants, organic and inorganic fillers, stabilizers, and flow aids.

The sulfonated polyethersulfone (s-PES) compositions of the present invention are useful as membranes for fuel cell applications based upon their good thermal and mechanical properties and proton conductivities (>0.1 S/cm). The compositions of the present invention are thermally robust and possess glass transition temperatures suitable for use in relatively harsh operating environments (e.g. 120-150° C.) to which fuel cell membranes are typically subjected. Thus, in one embodiment, the present invention relates to membranes comprising a polyethersulfone composition, and fuel cells containing such membranes.

Definitions

In the context of the present invention, alkyl is intended to include linear, branched, or cyclic hydrocarbon structures and combinations thereof, including lower alkyl and higher alkyl. Preferred alkyl groups are those of $C_{20}$ or below. Lower alkyl refers to alkyl groups of from 1 to 6 carbon atoms, preferably from 1 to 4 carbon atoms, and includes methyl, ethyl, n-propyl, isopropyl, and n-, s- and t-butyl. Higher alkyl refers to alkyl groups having seven or more carbon atoms, preferably 7-20 carbon atoms, and includes n-, s- and t-heptyl, octyl, and dodecyl. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl.

Aryl and heteroaryl mean a 5- or 6-membered aromatic or heteroaromatic ring containing 0-3 heteroatoms selected from nitrogen, oxygen or sulfur; a bicyclic 9- or 10-membered aromatic or heteroaromatic ring system containing 0-3 heteroatoms selected from nitrogen, oxygen or sulfur; or a tricyclic 13- or 14-membered aromatic or heteroaromatic ring system containing 0-3 heteroatoms selected from nitrogen, oxygen or sulfur. The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Arylalkyl means an alkyl residue attached to an aryl ring. Examples are benzyl and phenethyl. Heteroarylalkyl means an alkyl residue attached to a heteroaryl ring. Examples include pyridinylmethyl and pyrimidinylethyl. Alkylaryl means an aryl residue having one or more alkyl groups attached thereto. Examples are tolyl and mesityl.

Alkoxy or alkoxyl refers to groups of 1 to 8 carbon atoms of a straight, branched, cyclic configuration and combinations thereof attached to the parent structure through oxygen. Examples include methoxy, ethoxy, propoxy, isopropoxy, cyclopropyloxy, and cyclohexyloxy. Lower alkoxy refers to groups containing one to four carbons.

Acyl refers to groups of 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Heterocycle means a cycloalkyl or aryl residue in which one to four of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, triazoles (various isomers), benzotriazole, and triazines(various isomers), thiophene, furan, oxazole, oxazoline, isoxazole, dioxane, and tetrahydrofuran.

Substituted refers to residues, including, but not limited to, alkyl, alkylaryl, aryl, arylalkyl, and heteroaryl, wherein up to three H atoms of the residue are replaced with lower alkyl, substituted alkyl, aryl, substituted aryl, haloalkyl, alkoxy, carbonyl, carboxy, carboxalkoxy, carboxamido, acyloxy, amidino, nitro, halo, hydroxy, $OCH(COOH)_2$, cyano, primary amino, secondary amino, acylamino, alkylthio, sulfoxide, sulfone, phenyl, benzyl, phenoxy, benzyloxy, heteroaryl, or heteroaryloxy.

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended, and all possible combinations of numerical values between the lowest value and the highest value enumerated are to be considered to be expressly stated in this application in a similar manner.

EXAMPLES

Example 1

Monomer Synthesis—3,3'-Disulfonated-4,4'-Difluorodiphenylsulfone Disodium Salt

Difluorodiphenylsulfone (75.5 g, 0.297 mol) was transferred into a 500 mL round bottom flask. Fuming sulfuric acid (160 mL) was added. The mixture was stirred under nitrogen at 110° C. for 6 hours. The brown solution was cooled to room temperature and poured into 1 L ice cooled deionized water. NaCl (400 g) was added to salt out the product, which was isolated on a Buchner funnel. The white pasty solid was redissolved in deionized water, neutralized with 2.5 N NaOH solution, then crashed out with 450 g NaCl. The product was recrystallized from 3:1 isopropanol/water and dried under vacuum at 100° C. Isolated yield: 85 g (62%). $^1$H NMR (DMSO-d$_6$):δ 7.44 (t, 2H), 7.98 (m, 2H), 8.17 (dd, 2H). $^{13}$C NMR (DMSO-d$_6$): δ 118.42 (d, $^2J_{CF}$=25 Hz), 128.32 (d, $^3J_{CF}$=4 Hz), 130.99 (d, $^3J_{CF}$=11 Hz), 136.08 (d, $^4J_{CF}$=4 Hz), 136.61 (d, $^2J_{CF}$=19 Hz), 160.51 (d, $^1J_{CF}$=258 Hz).

Example 2

Monomer Synthesis—2-(3',5'-Dihydroxyphenyl)benzimidazole

The resorcinolic pendant benzimidazole monomer, 2-(3',5'-dihydroxyphenyl)benzimidazole, was synthesized by refluxing 3,5-dihydroxybenzoic acid and o-phenylenediamine in 4M hydrochloric acid (Scheme 1).

Scheme 1. Synthesis of 2-(3', 5'-dihydroxyphenyl) benzimidazole

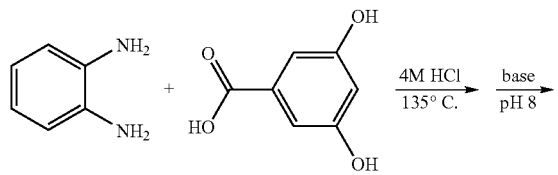

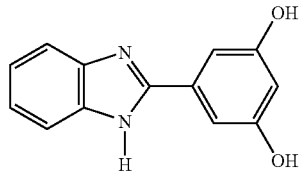

3,5-Dihydroxybenzoic acid (21.4 g, 0.14 mol) and o-phenylenediamine (10 g, 0.093 mol) were refluxed in 4M hydrochloric acid (200 mL) at 135° C. for 24 hours under nitrogen. The mixture was cooled to room temperature and then neutralized to pH 6 with sodium hydroxide and then to pH 8 with sodium bicarbonate. The precipitated tan-colored product was isolated by filtration and recrystallized from methanol/water (1:4) to yield tan-colored needles (6.2 g). $^1$H NMR (DMSO-d$_6$):δ 6.36 (1H, t), 7.04 (2H, d), 7.19 (2H, m), 7.47 (1H, d), 7.62 (1H, d), 9.56 (O—H,2H, s), 12.71 (N—H, 1H, s).

3,3'-Disulfonated4,4'-difluorodiphenylsulfone was synthesized according to the literature (Harrison, W. L., Wang, F., Mecham, J. B., Bhanu, V. A., Hill, M., Kim, Y. S., McGrath, J. E. *J. Polym. Sci. Part A: Polym. Chem.* (2003) 41, 2264-2276). Monomers were dried and stored in a nitrogen dry box. Toluene was dried over activated molecular sieves. All other chemicals were used as received

Example 3

Polymer Synthesis: Procedure 1

Copolymerization of the benzimidazole monomer, 4,4'-difluorodiphenylsulfone, 4,4'-biphenol, and 3,3'-disulfonated-4,4'-difluorodiphenylsulfone was carried out in N-methylpyrrolidinone (NMP) in the presence of excess potassium carbonate (Scheme 2). Toluene was added as a water-azeotroping agent. Benzimidazole (BZI) content was varied from 5-10 mol %, and sulfonation was maintained at 40 mol %.

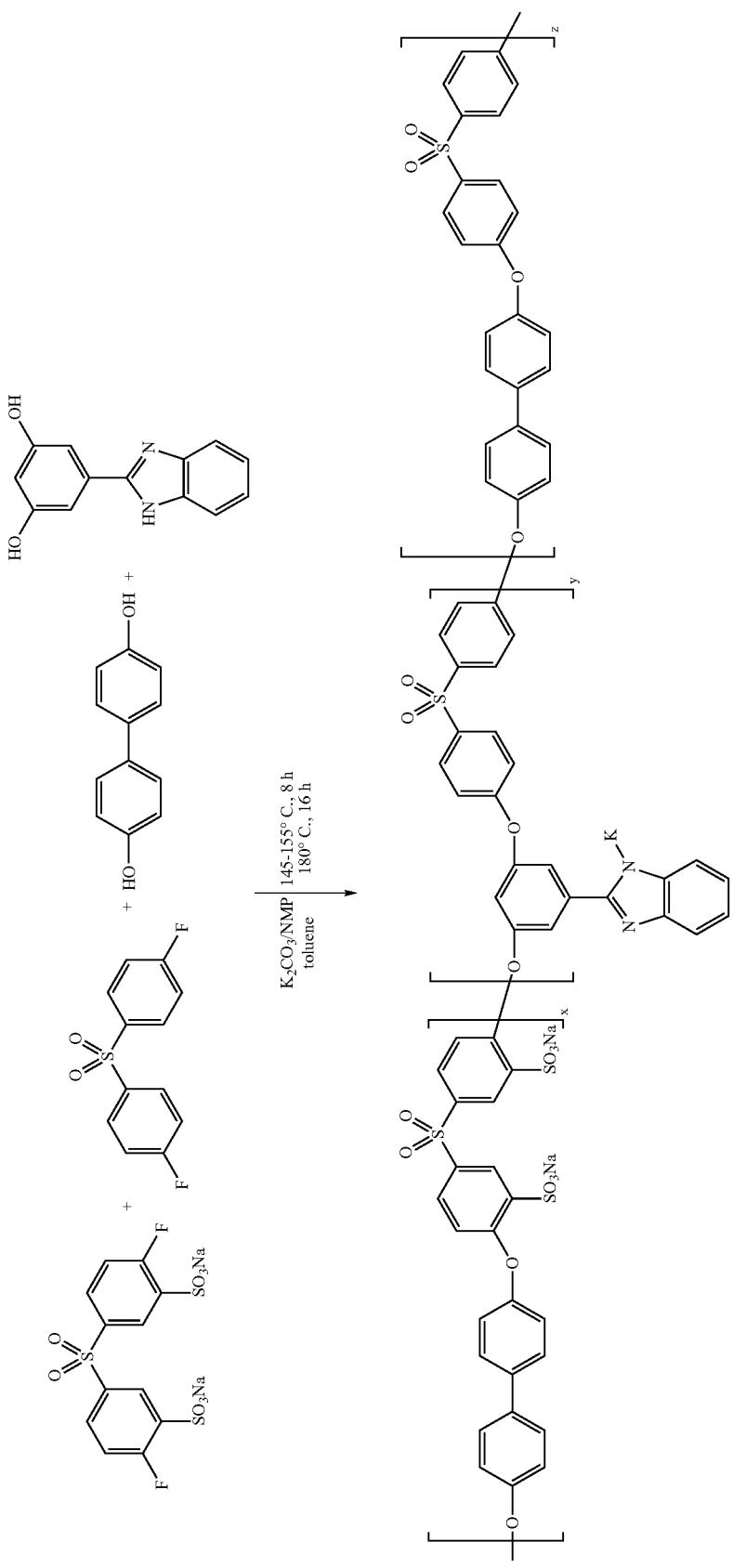
Scheme 2. Synthesis of pendant benzimidazole sulfonated polyethersulfone
x = 40%
y = 10-20%
z = 40-50%

4,4'-Difluorodiphenylsulfone (0.831 g, 3.27 mmol), 4,4'-biphenol (0.913 g, 4.9 mmol), 3,3'-disulfonated-4,4'-difluorodiphenylsulfone disodium salt (1 g, 2.18 mmol), and 2-(3',5'-dihydroxyphenyl)benzimidazole (0.123 g, 0.545 mmol) were transferred into a three-neck flask connected to a Dean-Stark trap, nitrogen adapter, and mechanical stirrer. Anhydrous NMP (7 mL) was added to dissolve the monomers. Potassium carbonate (1.13 g, 8.2 mmol) and toluene (1.5 mL) were added to the flask. The mixture was stirred at 145° C. for 4 hours, then 155° C. for 4 hours, then 180° C. for 16 hours. The viscous polymerization mixture was diluted with NMP (8 mL) and then hot-filtered through Celite over a coarse glass frit. The polymer was precipitated into isopropanol, washed several times and then dried under vacuum at 100° C. for 24 hours.

Example 4

General Synthesis of Sulfonated Polymers (Procedure 2)

This polymerization procedure consistently produced higher molecular weight polymers, which were more desirable for membrane mechanical properties. 4,4'-Biphenol (4.571 g, 24.5 mmol), 2-(3',5'-dihydroxyphenyl)benzimidazole (0.617 g, 2.73 mmol), and $K_2CO_3$ (5.645 g, 40.8 mmol) were transferred into a three-neck flask connected to a Dean-Stark trap, nitrogen adapter, and mechanical stirrer. Anhydrous NMP (34 mL) and toluene (9 mL) were added. The mixture was stirred at 145° C. for 4 hours. Difluorodiphenylsulfone (4.160 g, 16.4 mmol) and sulfonated difluorodiphenylsulfone (5 g, 10.9 mmol) were added to the reaction, and the mixture was stirred at 155° C. for 2 hours, during which residual toluene/water was removed by azeotropic distillation. The viscous mixture was removed from heat, and NMP (45 mL) was added to dilute. The mixture was filtered through Celite over a coarse glass frit, and the polymer was precipitated into isopropanol, washed several times, and then dried under vacuum at 100° C. Residual salts/$K_2CO_3$ were removed by stirring the polymer in water several times. Note: Filtering the mixture can remove higher molecular weight fractions of the polymer that might be desirable for better mechanical properties. Alternative workup procedure: precipitate the diluted reaction mixture into stirring water (or isopropanol) and then wash the polymer several times with water.

Example 5

Membrane Preparation

The pure polymers were cast onto a glass plate from 25-30 wt % solutions in DMSO using a doctor blade. The films were dried at 50° C. for 4 hours and then under vacuum at 100° C. for 24 hours. Acidification of the films was achieved by soaking in 1M sulfuric acid at room temperature for 24 hours, followed by soaking in deionized water for 6 hours. The films were then dried in the vacuum oven at 100° C. for 24 hours. Composite films were made by solution blending the salt form of the polymers with phosphotungstic acid (PTA) in DMSO (30 wt % solutions) and then casting, drying, and acidifying as described above for the pure polymer films.

Example 6

Membrane Proton Conductivity

The proton conductivity of the polymer membranes was determined by 4-electrode impedance measurements at various temperatures and relative humidities. Measurements used a Parstat impedance analyzer with PowerSine software, using a signal amplitude that ranged from 5 to 50 mV and frequencies ranging from 2 Hz to 2 MHz. The sample dimensions varied between samples, with a typical sample being 1.5 cm×2.5 cm and having a thicknesses ranging from 20 to 100 μm. Typical membranes were 25-50 μm in thickness. Table 1 lists the proton conductivity of sulfonated polyethersulfones containing 0-10 mol % pendant benzimidazole and 0-50 wt % phosphotungstic acid. The presence of benzimidazole in the polymer reduced proton conductivity in the pure polymer films, likely due to benzimidazole complexation with sulfonic acid groups. However, incorporation of PTA resulted in a significant increase in conductivity, especially at lower relative humidities. The increase in conductivity was most noticeable in the benzimidazole-containing polymers, which showed orders of magnitude increases with phosphotungstic acid content at 50% RH. The data clearly show the synergistic effect of combining a small amount of benzimidazole (5 mol %) and increasing amounts of phosphotungstic acid in reducing the RH dependence of conductivity at 80° C. (FIG. 1). Conductivity as high as 0.07 S/cm was observed at 80° C., 100% RH, which is comparable to Nafion 117 (0.07 S/cm) under the same conditions, and at 80° C., the proton conductivity of the 5% benzimidazole composite with 50% PTA performed similarly to Nafion 117 over the range of 50-100% RH.

TABLE 1

Proton conductivity of 40% sulfonated pendant benzimidazole polyethersulfones.

| | | Conductivity (S/cm) | | | | | | | | |
|---|---|---|---|---|---|---|---|---|---|---|
| | | 0% BZI | | | 5% BZI | | | 10% BZI | | |
| Temp. (° C.) | RH (%) | 0% PTA | 30% PTA | 50% PTA | 0% PTA | 30% PTA | 50% PTA | 0% PTA | 30% PTA | 50% PTA |
| 20 | 100 | 0.03 | 0.05 | 0.07 | 0.02 | 0.06 | 0.07 | 0.009 | 0.02 | 0.02 |
| 60 | 50 | 0.002 | 0.01 | 0.02 | 0.0002 | 0.002 | 0.01 | <0.0001 | 0.0008 | 0.002 |
| 80 | 25 | <0.0001 | 0.0002 | 0.0005 | <0.0001 | 0.0002 | 0.003 | <0.0001 | 0.0002 | 0.0001 |
| 80 | 50 | 0.003 | 0.007 | 0.01 | 0.0002 | 0.002 | 0.01 | <0.0001 | 0.002 | 0.004 |
| 80 | 75 | 0.02 | 0.04 | 0.03 | 0.004 | 0.01 | 0.03 | 0.001 | 0.01 | 0.02 |

TABLE 1-continued

Proton conductivity of 40% sulfonated pendant benzimidazole polyethersulfones.

| | | Conductivity (S/cm) | | | | | | | | |
|---|---|---|---|---|---|---|---|---|---|---|
| | | 0% BZI | | | 5% BZI | | | 10% BZI | | |
| Temp. (°C.) | RH (%) | 0% PTA | 30% PTA | 50% PTA | 0% PTA | 30% PTA | 50% PTA | 0% PTA | 30% PTA | 50% PTA |
| 80 | 100 | 0.05 | 0.05 | 0.06 | 0.02 | 0.06 | 0.07 | 0.01 | 0.03 | 0.05 |
| 100 | 50 | 0.002 | 0.009 | 0.01 | 0.0005 | 0.005 | 0.01 | 0.0003 | 0.003 | 0.004 |
| 100 | 75 | 0.01 | 0.02 | 0.03 | 0.003 | 0.01 | 0.03 | 0.002 | 0.01 | 0.01 |
| 120 | 50 | 0.002 | 0.006 | 0.008 | 0.0002 | 0.002 | 0.007 | <0.0001 | 0.002 | 0.005 |

Polymers containing less benzimidazole (1.5-3.5 mol %) and greater amounts of phosphotungstic acid were also evaluated. Results appear in Table 2.

TABLE 2

Proton conductivity of 40% sulfonated polyethersulfones containing less benzimidazole and more PTA

| | | Conductivity (S/cm) | | | |
|---|---|---|---|---|---|
| | | 1.5% BZI | | 3.5% BZI | |
| Temp. (°C.) | RH (%) | 50% PTA | 60% PTA | 50% PTA | 60% PTA |
| 20 | 100 | 0.0577 | 0.1132 | 0.0369 | 0.0461 |
| 60 | 50 | 0.0101 | 0.0025 | 0.0074 | 0.0064 |
| 80 | 25 | 0.0009 | 0.0021 | 0.0006 | 0.0011 |
| 80 | 50 | 0.0086 | 0.0157 | 0.0066 | 0.0148 |
| 80 | 75 | 0.0367 | 0.0339 | 0.0251 | 0.0310 |
| 80 | 100 | 0.1609 | 0.2481 | 0.1073 | 0.2334 |
| 100 | 50 | 0.0097 | 0.0126 | 0.0070 | 0.0141 |
| 100 | 75 | 0.0347 | 0.0299 | 0.0259 | 0.0346 |
| 120 | 50 | 0.0089 | 0.0082 | 0.0072 | 0.0079 |

The 50 wt % composite polymers containing 1.5-3.5 mol % benzimidazole had intermediate conductivities when compared to the 0 and 5 mol % benzimidazole composites. When phosphotungstic acid levels were increased to 60 wt %, conductivity at 25-50% RH was improved.

Example 5

Membrane Water Uptake

Membrane water uptake was determined using a thin film sample with a nominal area of ca. 20×20 mm$^2$. The sample film was first dried in a vacuum oven at 110° C. for 2 hours and then immediately weighed with a microbalance to obtain its dry weight. The film was then soaked for 2 hours in deionized water at various temperatures (room temperature, 60° C., 90° C., and boiling.) After soaking, the film was taken out, quickly patted dry to remove any surface water droplets, and then immediately weighed to obtain the sample weight after soaking. Water uptake is expressed as the percent increase in weight of the sample relative to the weight of the vacuum dried sample and is calculated according to the following equation:

Water Uptake=[weight (wet)−weight (dry)]/[weight (dry)]×100%

Water uptake of the sulfonated polymers and composites is shown in Table 3. The water uptake of the 40% sulfonated pendant benzimidazole polymer and composite was generally higher than that of Nafion 117. However, an increase in the benzimidazole content tended to decrease water uptake. Addition of PTA increased water uptake in the sulfonated benzimidazole polymer systems, contrary to what has been previously reported for sulfonated polyethersulfones in US 2002/0091225 (McGrath et al).

TABLE 3

| | | 0% BZI | | | 5% BZI | | | 10% BZI | | |
|---|---|---|---|---|---|---|---|---|---|---|
| T (°C.) | Nafion 117 | 0% PTA | 30% PTA | 50% PTA | 0% PTA | 30% PTA | 50% PTA | 0% PTA | 30% PTA | 50% PTA |
| 30 | 25 | 60 | 82 | 104 | 40 | 50 | 115 | 33 | 40 | 78 |
| 60 | 28 | 77 | 103 | 118 | 49 | 80 | 124 | 38 | 49 | 86 |
| 90 | 31 | n.d. | n.d. | n.d. | 61 | n.d. | 119 | 39 | 60 | n.d. | n.d. = not determined

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A polymer composition comprising a sulfonated polyethersulfone and at least one inorganic heteropolyacid, said polyethersulfone comprising structural units derived from at least one biphenol monomer and a monomer of formula I

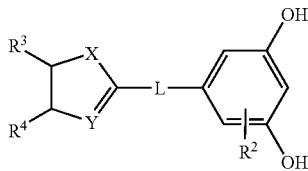

wherein X is O, S or NR¹;
Y is N or CR⁵,
R¹, R², R³ and R⁴ are independently hydrogen, alkyl, substituted alkyl, aryl, substituted aryl, alkylaryl, substituted alkylaryl, arylalkyl or substituted arylalkyl, or
R³ and R⁴, taken together, form a 5- or 6-membered substituted or unsubstituted aliphatic or aromatic ring;
R⁵ is hydrogen, alkyl, substituted alkyl, aryl, substituted aryl, alkylaryl, substituted alkylaryl, arylalkyl or substituted arylalkyl; and
L is a direct bond or a divalent aromatic linker containing 6-12 carbons.

2. A polymer composition according to claim 1, wherein the polyethersulfone comprises structural units derived from a dihalodiarylsulfone.

3. A polymer composition according to claim 2, wherein the polyethersulfone comprises structural units derived from at least one sulfonated dihalodiarylsulfone.

4. A polymer composition according to claim 1, wherein X is NR¹.

5. A polymer composition according to claim 1, wherein Y is N and R¹ is H.

6. A polymer composition according to claim 1, wherein R² is hydrogen.

7. A polymer composition according to claim 1, wherein R³ and R⁴ are taken together and form a 6-membered aromatic ring.

8. A polymer composition according to claim 1, wherein L is a direct bond.

9. A polymer composition according to claim 1, wherein R², R³ and R⁴ are hydrogen.

10. A polymer composition according to claim 1, comprising about 1-25 mol % of the structural units derived from the monomer of formula I.

11. A polymer composition according to claim 1, comprising about 2-15 mol % of the structural units derived from of the monomer of formula I.

12. A polymer composition according to claim 1, comprising about 2-7 mol % of the structural units derived from of the monomer of formula I.

13. A polymer composition according to claim 1, comprising about 5 mol % of the structural units derived from of the monomer of formula I.

14. A polymer composition according to claim 2, wherein about 30-70 mol % of the structural units derived from the dihalodiarylsulfone are sulfonated.

15. A polymer composition according to claim 2, wherein about 40-60 mol % of the structural units derived from the dihalodiarylsulfone are sulfonated.

16. A polymer composition according to claim 2, wherein about 40 mol % of the structural units derived from the dihalodiarylsulfone are sulfonated.

17. A polymer composition according to claim 1, wherein the inorganic heteropolyacid is phosphotungstic acid.

18. A polymer composition according to claim 1, comprising about 20-70 parts heteropolyacid and 30-80 parts sulfonated polyethersulfone.

19. A polymer composition according to claim 1, comprising about 40-60 parts heteropolyacid and 40-60 parts sulfonated polyethersulfone.

20. A polymer composition according to claim 1, comprising about 50 parts heteropolyacid and 50 parts sulfonated polyethersulfone.

21. A membrane comprising a polymer composition according to claim 1.

22. A polymer composition comprising a sulfonated polyethersulfone and phosphotungstic acid, said polyethersulfone comprising structural units derived from a 4,4'-dihalodiphenylsulfone, a sulfonated 4,4'-dihalodiphenylsulfone, biphenol and 2-(3',5'-dihydroxyphenyl)benzimidazole.

23. A polymer composition according to claim 22, wherein the polyethersulfone comprises about 40 mol % of the sulfonated 4,4'-dihalodiphenylsulfone.

24. A polymer composition according to claim 22, wherein the sulfonated polyethersulfone comprises about 5-10 mol % 2-(3',5'-dihydroxyphenyl)benzimidazole.

25. A polymer composition according to claim 22, wherein the sulfonated polyethersulfone comprises about 30-50 weight % phosphotungstic acid.

26. A fuel cell comprising a membrane according to claim 21.

* * * * *